(12) United States Patent
Farmer et al.

(10) Patent No.: US 10,113,463 B2
(45) Date of Patent: Oct. 30, 2018

(54) REMOTE FLUID SUPPLY FOR AN ENGINE

(71) Applicant: CLARK EQUIPMENT COMPANY, Statesville, NC (US)

(72) Inventors: Kyle Farmer, Statesville, NC (US); Chinmay Bhatt, Statesville, NC (US); Nicholas Harknett, Statesville, NC (US)

(73) Assignee: Clark Equipment Company, Statesville, NC (US)

( * ) Notice: Subject to any disclaimer, the term of this patent is extended or adjusted under 35 U.S.C. 154(b) by 160 days.

(21) Appl. No.: 14/881,876

(22) Filed: Oct. 13, 2015

(65) Prior Publication Data

US 2017/0101914 A1    Apr. 13, 2017

(51) Int. Cl.
F01N 3/20      (2006.01)
F02B 63/04     (2006.01)
H02K 7/18      (2006.01)

(52) U.S. Cl.
CPC ............ F01N 3/208 (2013.01); F02B 63/042 (2013.01); H02K 7/1815 (2013.01); F01N 2610/144 (2013.01); F01N 2610/1406 (2013.01); F01N 2610/148 (2013.01); F01N 2900/1814 (2013.01)

(58) Field of Classification Search
CPC .... F01N 3/2066; F01N 3/208; F01N 2590/10; F01N 2610/02; F01N 2610/1406; F01N 2610/142; F01N 2610/144; F01N 2610/148; F01N 2900/1814; F02B 63/042; H02K 7/1815
See application file for complete search history.

(56) References Cited

U.S. PATENT DOCUMENTS 5,884,475 A * 3/1999 Hofmann ........... B01D 53/9431
                                                    60/274
6,659,122 B1* 12/2003 Zahdeh ................. B60K 15/00
                                                    137/256
7,017,335 B2* 3/2006 Huber ................ B01D 53/9431
                                                    60/274

(Continued)

FOREIGN PATENT DOCUMENTS

DE    102006061732 A1    7/2008
EP       0928884 B1      7/1999

(Continued)

OTHER PUBLICATIONS

Extended European Search Report for Application No. 16193442.7 dated Feb. 22, 2017 (7 pages).

Primary Examiner — Laert Dounis
Assistant Examiner — Matthew T Largi
(74) Attorney, Agent, or Firm — Michael Best & Friedrich LLP

(57) ABSTRACT

A system includes a first diesel engine operable to drive a first device, a first DEF tank associated with the first engine and operable to provide DEF to the first diesel engine during operation, a second diesel engine operable to drive a second device, and a second DEF tank associated with the second engine and operable to provide DEF to the second diesel engine during operation. An external DEF tank is arranged to contain a quantity of DEF that is coupled to the first DEF tank and the second DEF tank and operable to selectively deliver DEF from the external DEF tank to each of the first DEF tank and the second DEF tank.

19 Claims, 6 Drawing Sheets

(56) References Cited

U.S. PATENT DOCUMENTS

| | | |
|---|---|---|
| 8,523,018 B2 | 9/2013 | Wilkins |
| 8,601,797 B2 | 12/2013 | Lee |
| 8,733,590 B2 | 5/2014 | Bartlett et al. |
| 2010/0326546 A1* | 12/2010 | Haeberer ............. F01N 3/2066 137/558 |
| 2012/0186677 A1 | 7/2012 | Wetzel et al. |
| 2013/0340417 A1 | 12/2013 | Morey et al. |
| 2014/0154142 A1 | 6/2014 | Johnson et al. |
| 2014/0369899 A1* | 12/2014 | Fahrenkrug ........... F01N 3/2066 422/173 |

FOREIGN PATENT DOCUMENTS

| | | | |
|---|---|---|---|
| JP | WO 2010032738 A1 * | 3/2010 | ......... B01D 53/8631 |
| WO | 2010032738 A1 | 3/2010 | |

* cited by examiner

REMOTE FLUID SUPPLY FOR AN ENGINE

BACKGROUND

Remote work sites regularly use engines and in particular diesel engines to provide power to drive components such as generator systems. These systems are often operated without supervision and without stop for extended periods of time. In operation, where a diesel engine is used, a diesel exhaust fluid (DEF) is often provided to treat the emissions of the engine.

SUMMARY

In one construction, the invention provides a system having a first diesel engine with a first local DEF tank, a second diesel engine with a second local DEF tank, and an external DEF tank fluidly coupled to each of the first and second local DEF tanks capable of selectively delivering DEF to the first and second local DEF tanks.

Another construction provides, a system that includes a first diesel engine operable to drive a first device, a first DEF tank associated with the first engine and operable to provide DEF to the first diesel engine during operation, a second diesel engine operable to drive a second device, and a second DEF tank associated with the second engine and operable to provide DEF to the second diesel engine during operation. An external DEF tank is arranged to contain a quantity of DEF that is coupled to the first DEF tank and the second DEF tank and operable to selectively deliver DEF from the external DEF tank to each of the first DEF tank and the second DEF tank.

Another construction provides, a system that includes a first diesel powered generator positioned within a first housing, a first DEF tank positioned within the first housing and operable to provide DEF to the first diesel powered generator during operation, and a first sensor coupled to the first DEF tank and operable to detect a quantity of DEF within the first DEF tank. A second diesel powered generator is positioned within a second housing, a second DEF tank is positioned within the second housing and is operable to provide DEF to the second diesel powered generator during operation, and a second sensor is coupled to the second DEF tank and is operable to detect a quantity of DEF within the second DEF tank. An external DEF tank is arranged to contain a supply of DEF and a pump is associated with the external DEF tank and is operable in response to each of a detected first quantity of DEF and a detected second quantity of DEF to selectively deliver DEF from the external DEF tank to each of the first DEF tank and the second DEF tank.

Another construction provides a system that includes a first diesel powered generator positioned within a first housing, a first DEF tank positioned within the first housing and operable to provide DEF to the first diesel powered generator during operation, and a first sensor coupled to the first DEF tank and operable to output a first signal indicative of a quantity of DEF within the first DEF tank. A second diesel powered generator is positioned within a second housing, a second DEF tank is positioned within the second housing and is operable to provide DEF to the second diesel powered generator during operation, and a second sensor is coupled to the second DEF tank and is operable to output a second signal indicative of a quantity of DEF within the second DEF tank. An external DEF tank is arranged to contain a supply of DEF and a pump is associated with the external DEF tank and is operable to pump fluid from the external DEF tank to each of the first DEF tank and the second DEF tank. A controller is operable to receive the first signal and the second signal and operable to direct DEF from the external DEF tank to the first DEF tank in response to the first signal being indicative of a low level of DEF within the first DEF tank, and operable to direct DEF from the external DEF tank to the second DEF tank in response to the second signal being indicative of a low level of DEF within the second DEF tank.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
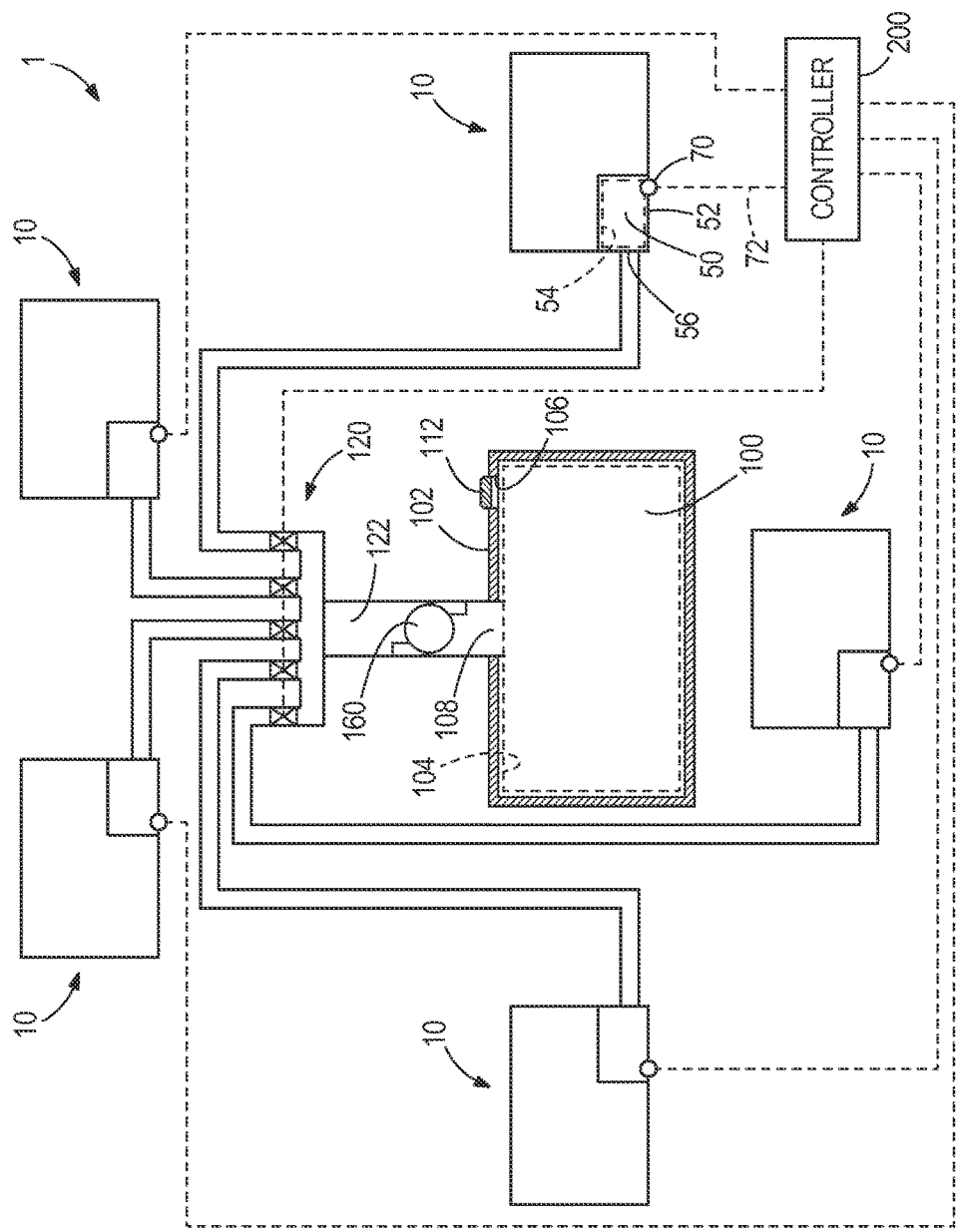
FIG. 1 is a schematic of an external DEF tank coupled to a plurality of gensets.

FIG. 1 illustrates a power generation system 1 that is operable to provide electrical power in remote locations where electrical power may not be readily available. The system 1 includes one or more gensets or power generators 10 that each operate individually to produce electrical power, an external diesel exhaust fluid (DEF) tank 100 fluidly coupled to each of the gensets 10, and a controller 200 to selectively deliver DEF to each genset 10. The system 1 operates to produce electrical power in remote areas for extended periods of time without the need for regular user intervention.

Figure 1A:
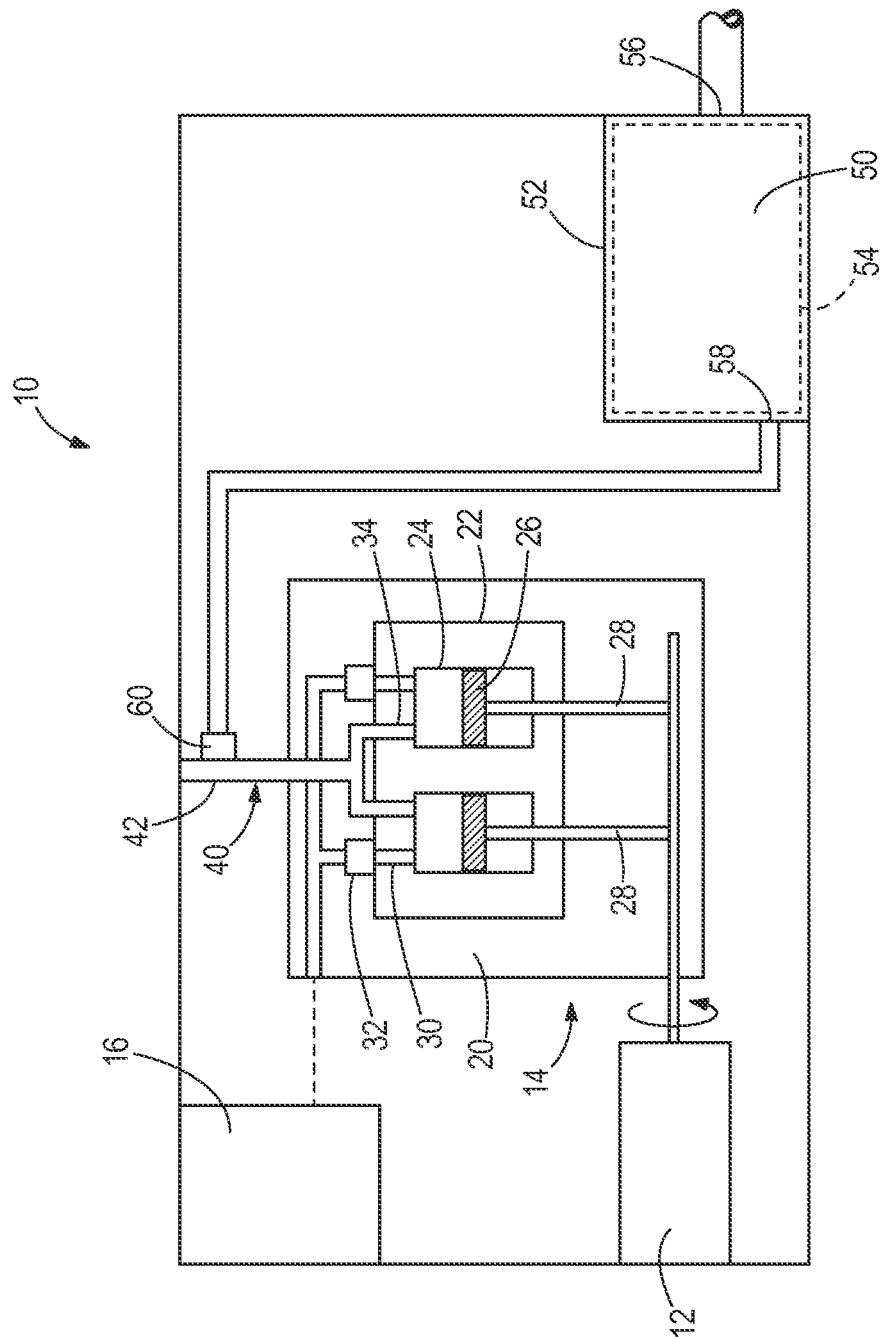
FIG. 1A is a detailed schematic of one genset of FIG. 1.

With reference to FIG. 1A, each genset 10 includes an electrical generator 12, a prime mover 14 that operates to drive the electrical generator 12, and a fuel tank 16 supplying fuel to the prime mover 14. The generator 12 includes a single phase or multi-phase generator that generates usable electrical power (DC or AC) at a desired voltage and frequency in response to rotation produced by the prime mover 14.

In the illustrated construction, the prime mover 14 includes a multi-cylinder diesel engine 20 with other prime movers being possible (e.g., internal combustion engines, combustion turbines, etc.). In this construction, the multi-cylinder diesel engine 20 includes an engine block 22 having one or more cylinders or chambers 24, a piston 26 disposed on the interior of each of the cylinders 24, and an output shaft 28 coupled to the pistons 26. Each of the cylinders 24 has an inlet 30 including a fuel injector 32 supplying diesel fuel from the fuel tank 16, and an outlet 34 fluidly connected to an exhaust system 40.

Figure 2:
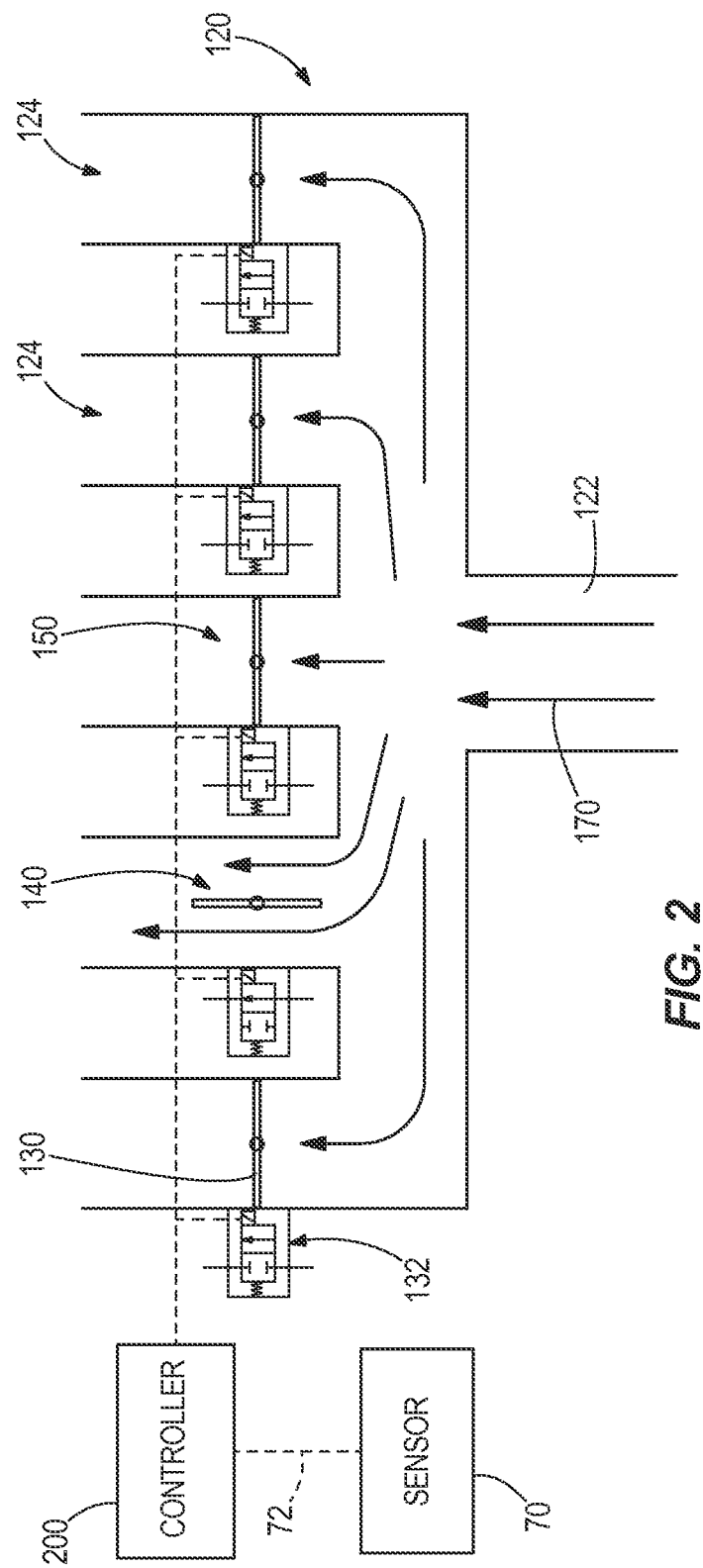
FIG. 2 is a schematic of a fluid coupling connecting the external DEF tank to one of the plurality gensets.

Each of the gensets 10 of FIGS. 1 and 1A further includes a local DEF tank 50 that is coupled to the exhaust system 40. The local DEF tanks 50 include an outer wall 52 defining a first volume 54, an inlet 56, an outlet 58 coupled to one or more DEF injectors 60 of the exhaust system 40, and a sensor 70 that measures an amount of DEF held in the local DEF tank 50 (e.g., liquid level sensor, load sensor, etc.) to generate a corresponding first signal 72 (FIG. 2). The exhaust system 40 of the genset 10 allows combustion products (e.g., $CO_2$, $H_2O$, $NO_x$, etc.) created in the diesel engine 20 when diesel fuel is burned to be transported from the cylinders 24 to the surrounding atmosphere through one or more exhaust pipes 42. The exhaust system 40 and the local DEF tank 50 are fluidly connected, with the DEF injectors 60 supplying the DEF stored in the local DEF tank 50 to the each of the exhaust pipes 42. The DEF is used to treat the combustion products, which contain a group of compounds collectively referred to as $NO_x$, in order to reduce $NO_x$ concentration in the combustion products via a selective catalytic reduction reaction as the combustion products move through the exhaust pipes 42.

FIG. 1 also illustrates the external DEF tank 100 fluidly coupled to each of the local DEF tanks 50 of each genset 10. The external DEF tank 100 includes an outer wall 102 defining a second volume 104, a refilling aperture 106, and an outlet 108 fluidly connected to an inlet 122 of a fluid coupling member or manifold 120. The external DEF tank 100 holds the second volume 104 of DEF that is substantially greater than the first volume 54 held in each of the local DEF tanks 50. DEF may be introduced through the refilling aperture 106, which has a removable cap 112 having an open and closed configuration. DEF can be added to the external DEF tank 100 when the cap 112 is in an open configuration, but the external DEF tank 100 is sealed from spillage of DEF and outside contaminants when the cap 112 is in a closed configuration. In the illustrated construction, the outlet 108 of the tank provides a fluid pathway connecting the external DEF tank 100 to the manifold 120, and thus forms a first portion of a connection between the external DEF tank 100 and the local DEF tanks 50 of the gensets 10. However, in other embodiments of the invention (not shown), the external DEF tank 100 may have a plurality of outlets, where each outlet defines a portion of one of multiple discrete fluid pathways connecting the external DEF tank 100 and each of the local DEF tanks 50 of each of the gensets 10.

FIG. 2 shows an enlarged view of the fluid coupling or manifold 120 of FIG. 1. The manifold 120 includes the inlet 122 and a plurality of outlets 124 each corresponding to one of the local DEF tanks 50 of each genset 10. Each of the plurality of outlets 124 includes a solenoid operated valve 130 that is operated by a switch 132 to be selectively moveable between an open configuration 140 and a closed configuration 150. In the open configuration 140, DEF is allowed to flow from the external DEF tank 100 to the local DEF tank 50 corresponding to the outlet 124. In the closed configuration 150, DEF flow is stopped at the valve 130. In this construction, a pump 160 (FIG. 1) is provided to create a driving pressure 170 in order to move DEF from the external tank 100, through the manifold 120, and to the local DEF tanks 50. The pump 160 shown is a fluid pump actively pressurizing fluid and driving flow. However, any other suitable configurations in which a pump generates a driving pressure, such as a pump disposed on the external DEF tank 100 functioning to pressurize the tank, may be used.

The controller 200 is operatively connected to each sensor 70 of each local DEF tank 50 and the switch 132 that is operatively connected to each solenoid operated valve 130. The controller 200 is configured to receive the first signal 72 from the sensor 70 of each local DEF tank 50, and determine if that signal 72 corresponds to a low fluid level (e.g., a fluid level below a predetermined value) or a high fluid level. The controller 200 is further capable of controlling the switch 132 in order to energize or de-energize the solenoid operated valve 130 and move it to the open 140 or the closed configuration 150. In preferred constructions, the controller includes a microprocessor based controller. However, other controllers may include PLCs or even simple analog controllers.

In another construction, multiple controllers 200 may be connected to one or more sensors 70 of each local DEF tank 50 and to one or more switches 132 operatively connected to each solenoid valve 130. In other words, each controller 200 may operate multiple solenoid operated valves 130. In a preferred construction, each sensor 70 and solenoid operated valve 130 associated with each local DEF tank 50 is operated by an individual controller 200.

In another construction, the sensor 70 includes a liquid level switch that directly opens and closes a circuit to the solenoid valve 130. In this arrangement, the controller 200 is distributed between the various sensor switches 132. In this construction, when the liquid level drops below a certain value, the switch is closed and the solenoid valve 130 is actuated to allow flow to the local DEF tank 50. As the fluid level rises, it eventually reaches a high level and the switch 132 moves to an open position which opens the circuit and de-energizes the solenoid valve 130 to stop the flow of DEF to the local DEF tank 50.

In yet another construction, a simple mechanical controller is employed. The mechanical controller includes a float valve that opens and closes a flow path to control the flow of fluid from the external DEF tank 100 to the local DEF tank 50.

In operation of the construction of FIGS. 1 and 2, diesel fuel is provided to each genset's 10 diesel engine 20 and combusted to produce shaft power and a flow of exhaust gases. The shaft power directly or indirectly drives the generator 12 to provide the desired electrical power. The exhaust gases flow through the engine exhaust system 40 where various cleaning and treating processes may occur before discharging the exhaust gas into the atmosphere. DEF is drawn from the local DEF tank 50 of each genset 10 and injected into the exhaust stream. The DEF reacts with the exhaust gas to break down the undesirable NOx emissions to provide a more desirable exhaust gas make-up. As DEF is drawn from the local DEF tank 50, the level of DEF will drop. Eventually, the controller 200 receives the signal 72, determines it is indicative of a low DEF level, and actuates the switch 132 of the solenoid operated valve 130 that leads to the particular local DEF tank 50 that is experiencing the low level. The solenoid operated valve 130 is energized and moved to the open configuration 140, and DEF is now free to flow from the external DEF tank 100 to the local DEF tank 50. The controller 200 eventually determines the signal 72 is indicative of a high level within the local DEF tank 50 and the controller 200 actuates the switch 132 of the solenoid operated valve 130, causing the solenoid operated valve 130 to be de-energized thereby moving the valve to the closed configuration 150. In other constructions, the controller 200 may operate to allow the valve to stay open a predetermined amount of time or any other acceptable operation for selectively operating the valve 130 to allow fluid flow to fill the local DEF tanks 50.

Figure 3:
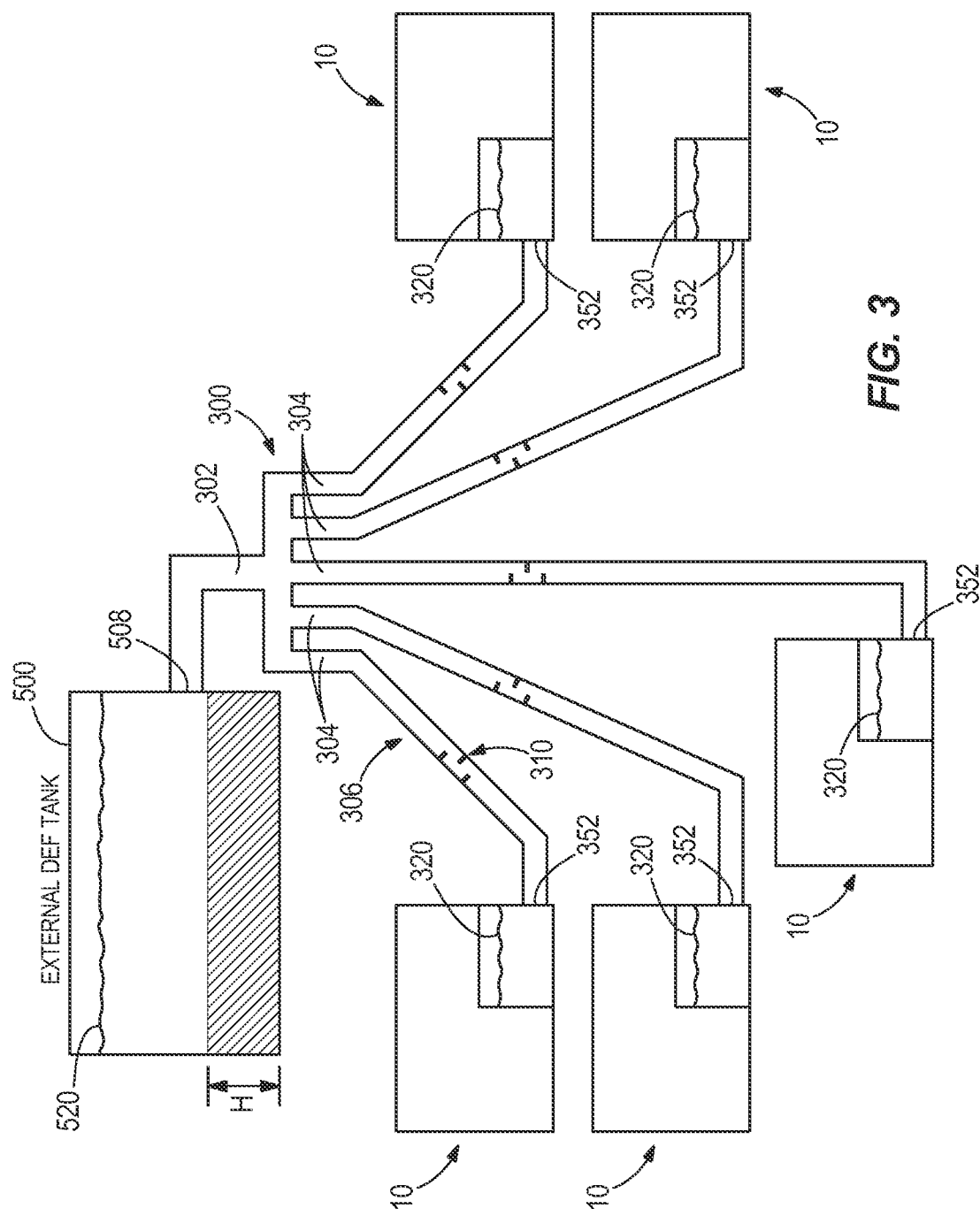
FIG. 3 is a schematic of an elevated external DEF tank coupled to a plurality of diesel engines.

An alternate embodiment of a power generation system, similar to the one shown in FIG. 1, is illustrated in FIG. 3. In this construction, the pump 160 and controller 200 are omitted. This description will focus on the aspects of the embodiment shown that are different from the embodiment shown in FIG. 1. It should be noted, however, that any features and alternatives presented in this embodiment may be incorporated or substituted into the embodiment of FIG. 1 or vice versa.

With reference to FIG. 3, an external DEF tank 500 of this embodiment is elevated by a height H. The height H is substantially greater than a height of each of the local DEF tanks 50 disposed in the gensets 10. The external DEF tank 500 of FIG. 3 includes an outlet 508 disposed near the bottom of an outer wall. However, it should be noted that the outlet may be located in any position (e.g., on the lower surface of the tank) where the DEF in the tank uses the hydrostatic force produced by elevation (e.g., height H) of the fluid in the tank to provide driving pressure 170 that moves the DEF through the outlet 508 and to the plurality of local DEF tanks 50.

With continued reference to FIG. 3, the fluid leaves the outlet 508 of the external DEF tank 500 and enters an inlet 302 of a manifold 300. The manifold 300 has a plurality of outlets 304 that lead along a plurality of flow paths 306 to each of the local DEF tanks 50, where they enter each local DEF tank 50 through an inlet 52. Each flow path 306 may be equipped with a flow restriction device 310 that controls the pressure drop through the flow path 306 and therefore the amount of fluid passed to each local DEF tank 50. The inlet 352 of each local DEF tank 50 is below a fluid level line 320 defined by the level of fluid on the interior of each local DEF tank 50, which also defines an inlet resistance. The driving pressure 170 is determined based on the difference in the level of fluid 520 within the local DEF tanks 50 and the level of the fluid within the external DEF tank 500. The difference in the liquid levels defines a pressure gradient that can produce a natural flow from the external DEF tank 500 to the local DEF tank 50 so long as a flow resistance (e.g., inlet resistance, friction, length of pipe, flow obstructions, etc.) is not greater than the pressure gradient. Since the driving pressure 170 is governed by the force of gravity on the DEF in the external DEF tank 500, the flow restriction devices 310 may operate to restrict or permit flow based on changing pressures as the external DEF tank 500 empties (thus altering the driving pressure 170) to maintain a substantially constant amount of DEF in the local DEF tanks 50.

The flow restriction devices 310 may include an electronically actuated solenoid valve, a float valve, or a butterfly valve operated by a pressure switch, a passive flow limiter, or any other device suitable for governing fluid flow based on predetermined parameters. In other constructions, the flow restriction device 310 may be disposed on the individual local DEF tanks 50 to selectively operate DEF flow at the inlet 352 of the local DEF tank 50, or a single flow restriction device 310 may be placed on the outlet 508 of the external DEF tank 500 to govern flow and maintain the same level of DEF in each local DEF tank 50.

Figure 4:
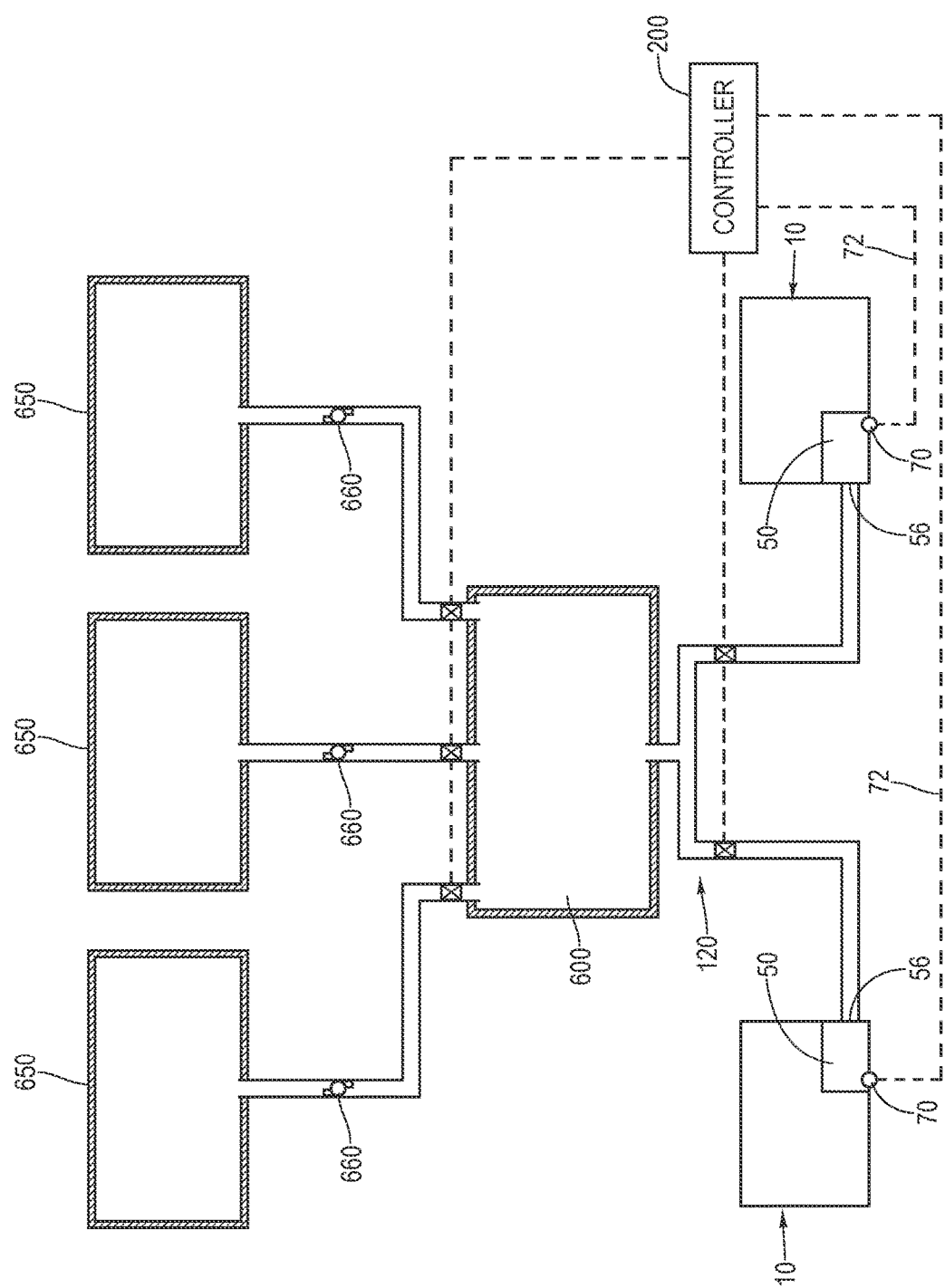
FIG. 4 is a schematic of a plurality of auxiliary external DEF tanks coupled to a main external DEF tank that supplies at least one genset.

FIG. 4 illustrates yet another embodiment of the power generation system, which is similar to the embodiments shown in FIGS. 1 and 3. This description will focus on the aspects of the embodiment shown that are different from the embodiments shown in FIGS. 1 and 3. It should be noted, however, that any features and alternatives presented in this embodiment may be incorporated or substituted into the embodiment of FIGS. 1 and 3, or vice versa.

With reference to FIG. 4, one or more auxiliary external DEF tanks 650 are fluidly coupled to a main external DEF tank 600 in order to supply the main external DEF tank 600 with reserve DEF. In the illustrated construction, each auxiliary external DEF tank 650 includes a pump 660 to selectively deliver DEF from the auxiliary external DEF tank 650 to the main external DEF tank 600. In an alternate construction, the DEF from the auxiliary external DEF tanks 650 may be fed into the main external DEF tank 600 via a gravity feed system similar to the mechanism for delivery of DEF from the external DEF tank 500 to gensets 10 illustrated in FIG. 3. Furthermore, each auxiliary external DEF tank 650 may optionally be fluidly coupled to a manifold (not shown) that is coupled to the main external DEF tank 600 via a single, regulated flow path to maintain DEF levels within the main external DEF tank 600.

Figure 5:
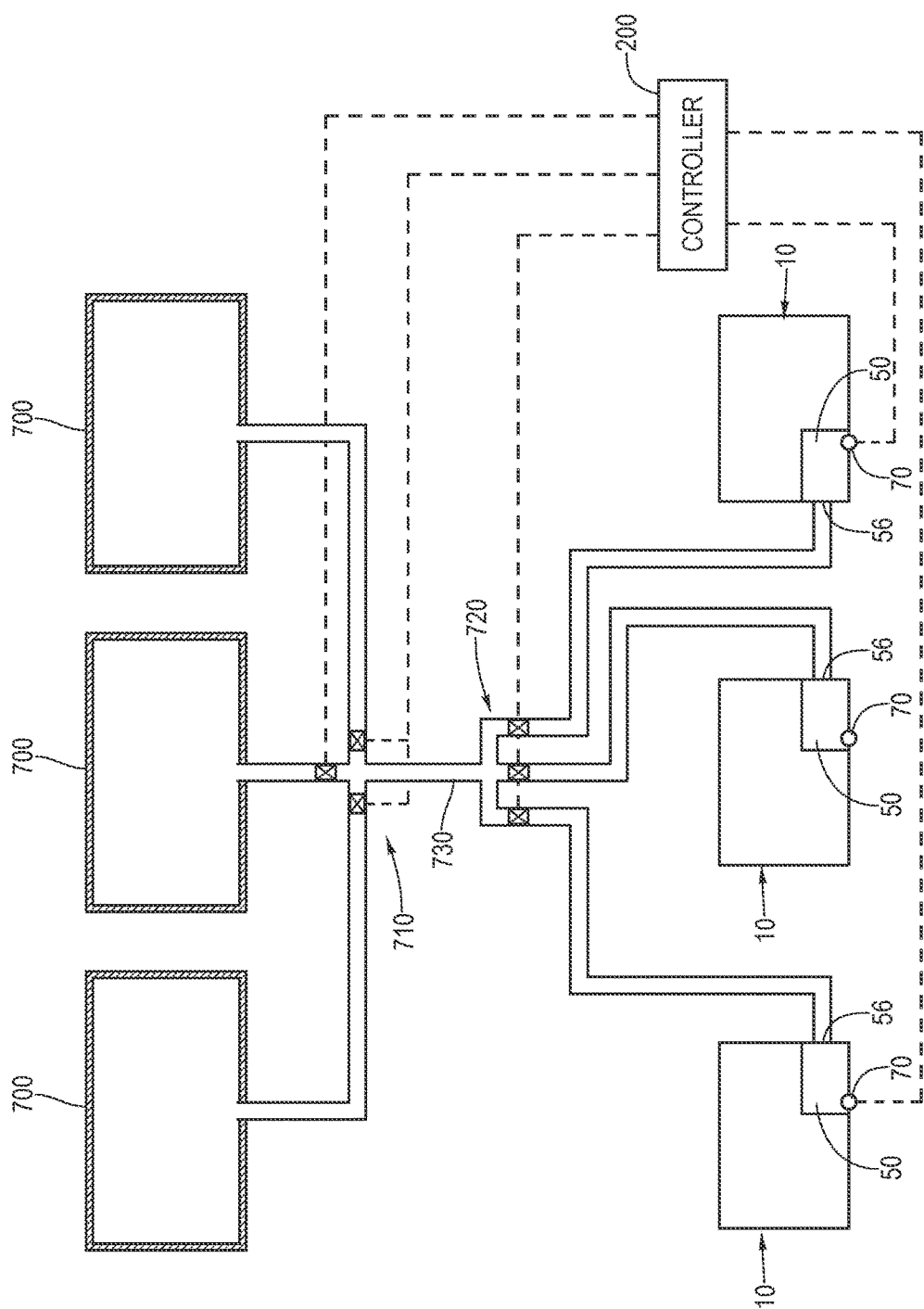
FIG. 5 is a schematic of a plurality of external DEF tanks fluidly coupled to at least one genset.

FIG. 5 illustrates another embodiment of the power generation system, which is similar to the embodiments shown in FIGS. 1, 3 and 4. This description will focus on the aspects of the embodiment shown that are different from the embodiments shown in FIGS. 1, 3 and 4. It should be noted, however, that any features and alternatives presented in this embodiment may be incorporated or substituted into the embodiment of FIGS. 1, 3 and 4, or vice versa.

With reference to FIG. 5, two or more external DEF tanks 700 are each connected to a first manifold 710, which may be similar to manifolds 120 or 300 illustrated in FIGS. 1 and 3, respectively, in all aspects except DEF flows in an opposite direction thereby converging to a main DEF line 730. A second manifold 720, similar to the manifolds 120 or 300 in FIGS. 1 and 3, respectively, is coupled to the main DEF line 730 downstream of the first manifold 710 in order to selectively direct DEF to each genset 10. In this system, DEF may be delivered from the external tanks to the gensets 10 via the mechanisms described with reference to FIGS. 1 and 3 (i.e., utilizing pumps or a gravity feed), or any other suitable mechanism.

In the constructions set forth above, local DEF tanks maintain an operational amount of DEF as supplied by the external DEF tanks for extended periods of time. This allows for unmanned function (e.g., removing the need for multiple local DEF tank refueling accomplished manually by a user) over longer periods of time than traditional unmanned gensets. For remote locations where user intervention is difficult or unavailable, as well as for decreasing the need for intervention in any environment, this power generation system represents a significant advantage.

Various features and advantages of the invention are set forth in the following claims.

What is claimed is:
1. A system comprising:
a first diesel engine operable to drive a first device;
a first diesel exhaust fluid ("DEF") tank associated with the first engine and operable to provide DEF to the first diesel engine during operation;
a second diesel engine operable to drive a second device;

a second DEF tank associated with the second engine and operable to provide DEF to the second diesel engine during operation;
an external DEF tank arranged to contain a quantity of DEF that is coupled to the first DEF tank and the second DEF tank and operable to selectively deliver DEF from the external DEF tank to each of the first DEF tank and the second DEF tank;
a manifold including an inlet fluidly connected to the external DEF tank, a first outlet fluidly connected to the first DEF tank, and a second outlet fluidly connected to the second DEF tank;
a first valve associated with the first outlet, the first valve configured to move between a closed position in which no DEF flows through the first outlet and an open position in which DEF flows through the first outlet; and
a second valve associated with the second outlet, the second valve configured to move between a closed position in which no DEF flows through the second outlet and an open position in which DEF flows through the second outlet.

2. The system of claim 1, further comprising a pump operable to deliver DEF from the external DEF tank to each of the first DEF tank and the second DEF tank.

3. The system of claim 1, wherein the first device is a generator and the second device is a generator.

4. The system of claim 2, further comprising a first sensor coupled to the first DEF tank and operable to output a first signal indicative of a quantity of DEF within the first DEF tank, and a second sensor coupled to the second DEF tank and operable to output a second signal indicative of a quantity of DEF within the second DEF tank.

5. The system of claim 4, wherein the first sensor is a liquid level sensor and the second sensor is a liquid level sensor.

6. The system of claim 4, further comprising a controller operable to receive the first signal and the second signal and operable to activate the pump to direct DEF from the external DEF tank to the first DEF tank in response to the first signal being indicative of a low level of DEF within the first DEF tank, and operable to activate the pump to direct DEF from the external DEF tank to the second DEF tank in response to the second signal being indicative of a low level of DEF within the second DEF tank.

7. The system of claim 2, further comprising a manifold including an inlet and a plurality of outlets, wherein the pump delivers DEF to the inlet and wherein a first of the plurality of outlets is fluidly coupled to the first DEF tank and a second of the plurality of outlets is fluidly coupled to the second DEF tank.

8. The system of claim 7, further comprising a plurality of valves, each valve associated with one of the plurality of outlets, wherein each valve is movable between a closed position in which no DEF flows through the outlet and an open position in which DEF flows through the outlet.

9. The system of claim 8, wherein the valves are solenoid operated valves, and wherein a controller selectively actuates the solenoids to move the valves between the open position and the closed position.

10. The system of claim 1, further comprising a controller operable to separately selectively actuate the first valve and the second valve between the open position and the closed position.

11. The system of claim 1, wherein the external DEF tank is a first external DEF tank, and the manifold is a second manifold, and further comprising:
a second external DEF tank arranged to contain a quantity of DEF;
a first manifold including a plurality of inlets and an outlet, a first of the plurality of inlets is fluidly coupled to the first external DEF tank, and a second of the plurality of inlets is fluidly coupled to the second external DEF tank; and
the inlet of the second manifold is fluidly coupled to the outlet of the first manifold.

12. A system comprising:
a first diesel powered generator positioned within a first housing;
a first diesel exhaust fluid ("DEF") tank positioned within the first housing and operable to provide DEF to the first diesel powered generator during operation;
a first sensor coupled to the first DEF tank and operable to detect a quantity of DEF within the first DEF tank;
a second diesel powered generator positioned within a second housing;
a second DEF tank positioned within the second housing and operable to provide DEF to the second diesel powered generator during operation;
a second sensor coupled to the second DEF tank and operable to detect a quantity of DEF within the second DEF tank;
an external DEF tank arranged to contain a supply of DEF;
a pump associated with the external DEF tank and operable in response to each of a detected first quantity of DEF and a detected second quantity of DEF to selectively deliver DEF from the external DEF tank to each of the first DEF tank and the second DEF tank;
a manifold including an inlet and a plurality of outlets, wherein the pump delivers DEF to the inlet and wherein a first of the plurality of outlets is fluidly coupled to the first DEF tank and a second of the plurality of outlets is fluidly coupled to the second DEF tank; and
a plurality of valves, each valve associated with one of the plurality of outlets, wherein each valve is movable between a closed position in which no DEF flows through the outlet and an open position in which DEF flows through the outlet.

13. The system of claim 12, wherein the first sensor is a liquid level sensor and the second sensor is a liquid level sensor.

14. The system of claim 12, wherein the first sensor is operable to output a first signal indicative of the quantity of DEF within the first DEF tank, and the second sensor is operable to output a second signal indicative of the quantity of DEF within the second DEF tank.

15. The system of claim 14, further comprising a controller operable to receive the first signal and the second signal and operable to activate the pump to direct DEF from the external DEF tank to the first DEF tank in response to the first signal being indicative of a low level of DEF within the first DEF tank, and operable to activate the pump to direct DEF from the external DEF tank to the second DEF tank in response to the second signal being indicative of a low level of DEF within the second DEF tank.

16. The system of claim 12, wherein the valves are solenoid operated valves, and wherein a controller selectively actuates the solenoids to move the valves between the open position and the closed position.

17. A system comprising:
a first diesel powered generator positioned within a first housing;

a first diesel exhaust fluid ("DEF") tank positioned within the first housing and operable to provide DEF to the first diesel powered generator during operation;

a first sensor coupled to the first DEF tank and operable to output a first signal indicative of a quantity of DEF within the first DEF tank;

a second diesel powered generator positioned within a second housing;

a second DEF tank positioned within the second housing and operable to provide DEF to the second diesel powered generator during operation;

a second sensor coupled to the second DEF tank and operable to output a second signal indicative of a quantity of DEF within the second DEF tank;

an external DEF tank arranged to contain a supply of DEF;

a pump associated with the external DEF tank and operable to pump fluid from the external DEF tank to each of the first DEF tank and the second DEF tank;

a manifold including an inlet and a plurality of outlets, wherein the pump delivers DEF to the inlet and wherein a first of the plurality of outlets is fluidly coupled to the first DEF tank and a second of the plurality of outlets is fluidly coupled to the second DEF tank;

a plurality of valves, each valve associated with one of the plurality of outlets, wherein each valve is movable between a closed position in which no DEF flows through the outlet and an open position in which DEF flows through the outlet; and a controller operable to receive the first signal and the second signal and operable to direct DEF from the external DEF tank to the first DEF tank in response to the first signal being indicative of a low level of DEF within the first DEF tank, and operable to direct DEF from the external DEF tank to the second DEF tank in response to the second signal being indicative of a low level of DEF within the second DEF tank.

18. The system of claim 17, wherein the first sensor is a liquid level sensor and the second sensor is a liquid level sensor.

19. The system of claim 17, wherein the valves are solenoid operated valves, and wherein the controller selectively actuates the solenoids to move the valves between the open position and the closed position.

* * * * *